(12) United States Patent
Rathi

(10) Patent No.: US 11,250,348 B1
(45) Date of Patent: Feb. 15, 2022

(54) SYSTEM, METHOD, AND COMPUTER PROGRAM FOR AUTOMATICALLY DETERMINING CUSTOMER ISSUES AND RESOLVING ISSUES USING GRAPHICAL USER INTERFACE (GUI) BASED INTERACTIONS WITH A CHATBOT

(71) Applicant: Amdocs Development Limited, Limassol (CY)

(72) Inventor: Anurag Rathi, Pune (IN)

(73) Assignee: AMDOCS DEVELOPMENT LIMITED, Limassol (CY)

( * ) Notice: Subject to any disclaimer, the term of this patent is extended or adjusted under 35 U.S.C. 154(b) by 315 days.

(21) Appl. No.: 16/212,597

(22) Filed: Dec. 6, 2018

Related U.S. Application Data

(60) Provisional application No. 62/595,419, filed on Dec. 6, 2017.

(51) Int. Cl.
| | |
|---|---|
| G06N 20/00 | (2019.01) |
| G06Q 30/00 | (2012.01) |
| G06F 3/0482 | (2013.01) |
| H04L 12/58 | (2006.01) |
| H04L 51/02 | (2022.01) |

(52) U.S. Cl.
CPC ........... *G06N 20/00* (2019.01); *G06F 3/0482* (2013.01); *G06Q 30/016* (2013.01); *H04L 51/02* (2013.01)

(58) Field of Classification Search
CPC ....... G06N 20/00; G06F 3/048; G06F 3/0481; G06F 3/0482; G06Q 30/016; H04L 51/02
USPC .................................................. 706/11, 12
See application file for complete search history.

(56) References Cited

U.S. PATENT DOCUMENTS

| | | | |
|---|---|---|---|
| 7,096,188 B1* | 8/2006 | Schlick ................. | G06Q 10/06 705/7.13 |
| 2005/0038827 A1 | 2/2005 | Hooks | |
| 2006/0229931 A1* | 10/2006 | Fligler .................. | G06Q 30/02 705/7.38 |
| 2010/0077008 A1* | 3/2010 | Davis ..................... | G06F 16/93 707/797 |

(Continued)

OTHER PUBLICATIONS

Geng et al., "Improving Web Navigation Usability by Comparing Actual and Anticipated Usage", IEEE Transactions on Human-Machine Systems, vol. 45, No. 1, Feb. 2015, pp. 84-94. (Year: 2015).*

(Continued)

*Primary Examiner* — Reza Nabi
*Assistant Examiner* — Hwei-Min Lu
(74) *Attorney, Agent, or Firm* — Zilka-Kotab, P.C.

(57) ABSTRACT

A system, method, and computer program product are provided for automatically determining customer issues and resolving issues using graphical user interface (GUI) based interactions with a chatbot. In operation, a system implements a self-learning algorithm that keeps track of all activities and usages associated with a subscriber account. Further, the system prepares storylines based on the activities and usages. The storylines are used to automatically create hypothetical issues that a subscriber associated with the subscriber account may be facing. The system also provides a GUI based chat option to the subscriber to communicate with a chatbot. The GUI based chat option includes a graphical representation of created hypothetical issues, and also suggests solutions to the hypothetical issues.

5 Claims, 13 Drawing Sheets

(56) References Cited

U.S. PATENT DOCUMENTS

| | | | |
|---|---|---|---|
| 2011/0154117 A1* | 6/2011 | Danielson | G06F 11/0748 714/37 |
| 2013/0036062 A1* | 2/2013 | Natarajan | G06Q 10/00 705/304 |
| 2014/0006330 A1* | 1/2014 | Biem | G06F 11/0751 706/46 |
| 2014/0068348 A1* | 3/2014 | Mondal | H04L 41/16 714/45 |
| 2014/0096249 A1* | 4/2014 | Dupont | G06F 21/552 726/23 |
| 2016/0034927 A1 | 2/2016 | Grushka | |
| 2017/0063897 A1* | 3/2017 | Muddu | G06F 3/04847 |
| 2017/0277582 A1* | 9/2017 | Chen | G06F 11/079 |
| 2017/0286199 A1* | 10/2017 | Soini | G06F 9/44 |
| 2019/0050239 A1* | 2/2019 | Caldwell | G06F 11/079 |
| 2019/0132224 A1* | 5/2019 | Verma | H04L 43/062 |

OTHER PUBLICATIONS

Sharma et al., "ISMA: Intelligent Sensing Model for Anomalies Detection in Cross Platform OSNs With a Case Study on IoT", IEEE Access, vol. 5, Mar. 2017, pp. 3284-3301. (Year: 2017).*

* cited by examiner

| DATA | ANOMALY | STORYLINE | SOLUTION |
|---|---|---|---|
| DATA FROM CRM CURRENT CONTEXT CURRENT INFO LEVEL SEEKABLE GRAPH .ATF FILE POINTERS | DYNAMIC RULES FOR ANOMALY TRAINER TO UPDATE RULES | COMPLETE PATH BETWEEN QUERY AND SOLUTION ACTIONS BASED ON CONTEXT META INFORMATION SEEK GRAPHS AND QUERIES | TEMPLATES HAVING READ DEEP READ AMEND STATES |

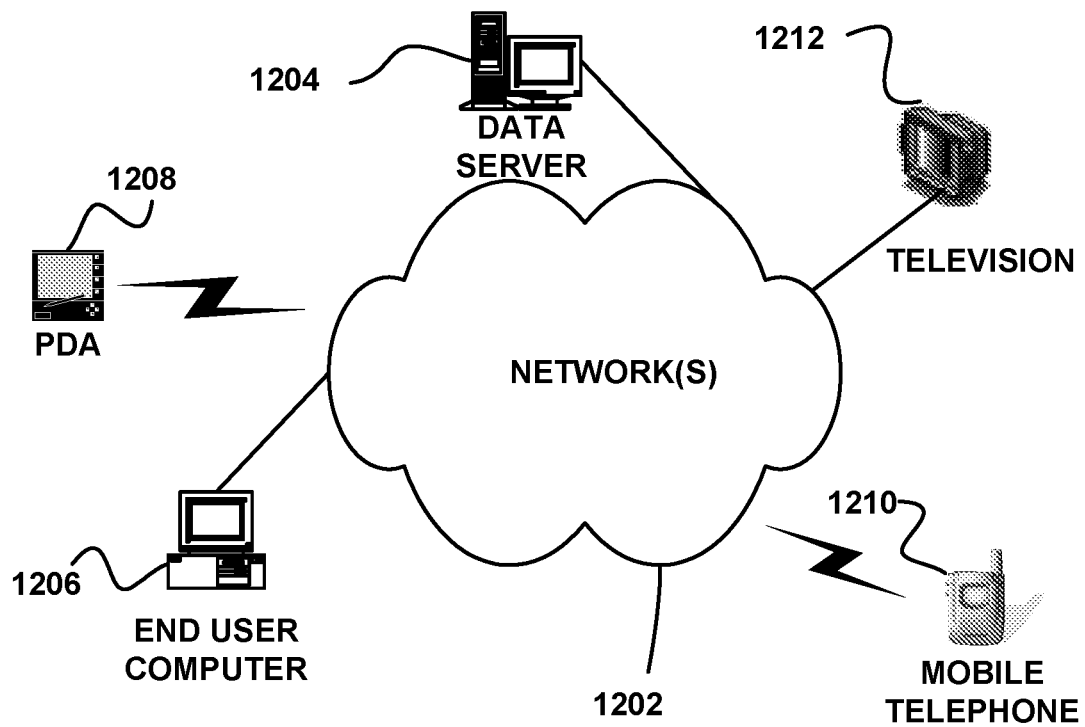
FIGURE 12

SYSTEM, METHOD, AND COMPUTER PROGRAM FOR AUTOMATICALLY DETERMINING CUSTOMER ISSUES AND RESOLVING ISSUES USING GRAPHICAL USER INTERFACE (GUI) BASED INTERACTIONS WITH A CHATBOT

FIELD OF THE INVENTION

The present invention relates to automated customer support for a customer using an application and, more particularly to, determination of behavioral and system anomalies within the application and providing automated GUI based solutions to the customer based on the anomalies.

BACKGROUND

Customer satisfaction plays an important role for businesses. It is the leading indicator for measuring customer loyalty, identifying unhappy customers, reducing churn and increasing revenue. It is also a key point of differentiation that helps companies to attract new customers in competitive business environments.

Customer service is important to an organization as it is often the only contact a customer has with a company. Some customers spend hundreds and even thousands of dollars per year with a company. Consequently, when they have a question or product issue, they expect a customer service department of company to resolve their issues.

Today, call centers are the major end points for resolving customer issues. For example, when a customer is having some issues with mobile billing, the customer may contact the support center to get the billing issue fixed.

Today, responsiveness to customer issues and needs has become increasingly important to most modern businesses. Handling such a large number of calls is not only a challenge for a telecom but also for e-commerce businesses that cannot afford the customer service provider with such a high unpredictable rate of calls.

There is thus a need for addressing these and/or other issues associated with the prior art.

SUMMARY

A system, method, and computer program product are provided for automatically determining customer issues and resolving issues using graphical user interface (GUI) based interactions with a chatbot. In operation, a system implements a self-learning algorithm that keeps track of all activities and usages associated with a subscriber account. Further, the system prepares storylines based on the activities and usages. The storylines are used to automatically create hypothetical issues that a subscriber associated with the subscriber account may be facing. The system also provides a GUI based chat option to the subscriber to communicate with a chatbot. The GUI based chat option includes a graphical representation of created hypothetical issues, and also suggests solutions to the hypothetical issues.

BRIEF DESCRIPTION OF THE DRAWINGS

FIG. 12 illustrates a network architecture, in accordance with one possible embodiment.

DETAILED DESCRIPTION

Figure 1:
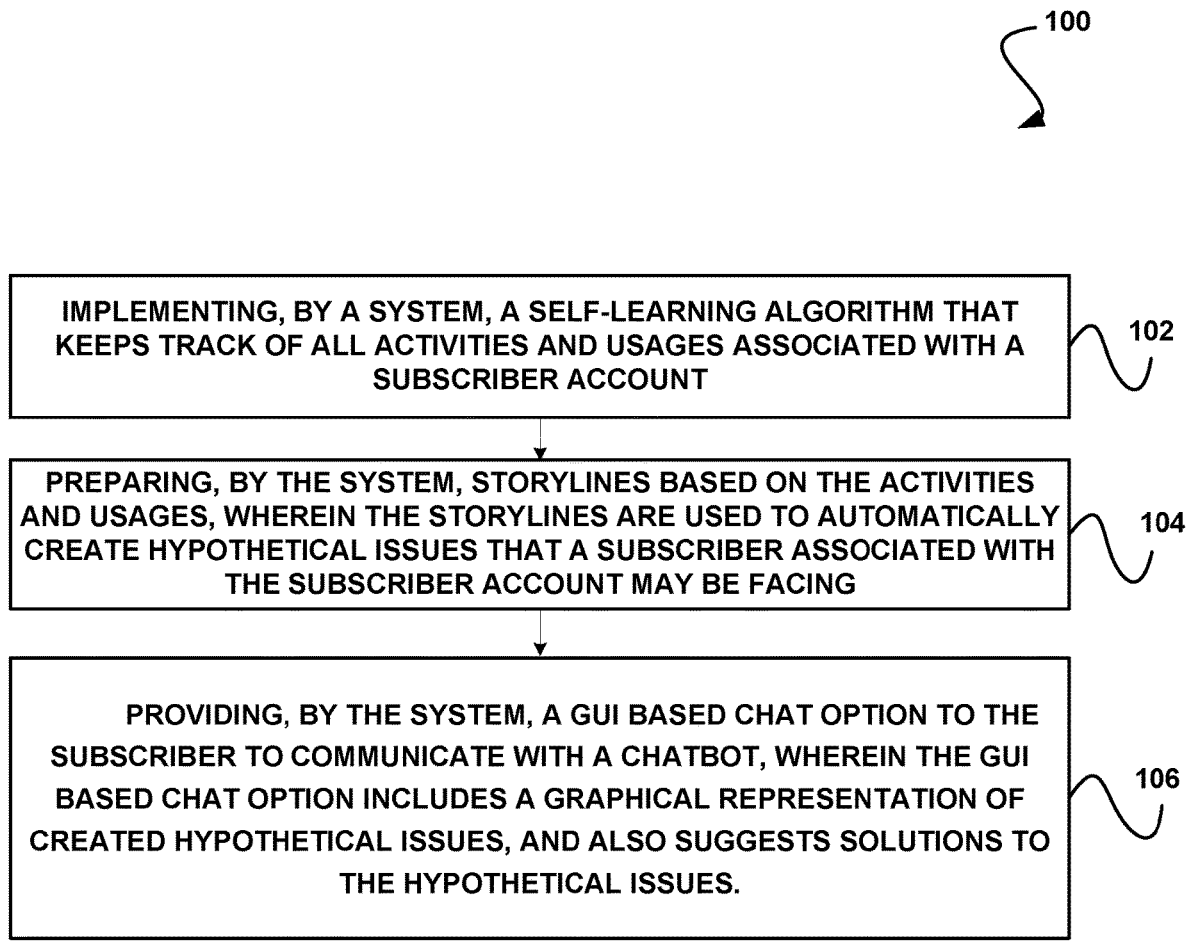
FIG. 1 illustrates a method for automatically determining customer issues and resolving issues using GUI based interactions with chatbot, in accordance with one embodiment.

FIG. 1 illustrates a method 100 for automatically determining customer issues and resolving issues using graphical user interface (GUI) based interactions with a chatbot, in accordance with one embodiment.

In operation, a system implements a self-learning algorithm that keeps track of all activities and usages associated with a subscriber account. See operation 102. Further, the system prepares storylines based on the activities and usages. See operation 104. The storylines are used to automatically create hypothetical issues that a subscriber associated with the subscriber account may be facing. The system also provides a GUI based chat option to the subscriber to communicate with a chatbot. See operation 106. The GUI based chat option includes a graphical representation of created hypothetical issues, and also suggests solutions to the hypothetical issues.

It should be noted that the method 100 may be implemented utilizing various systems, hardware, software, applications, user interfaces, etc., as dictated by the implementer. For example, the system implementing the method 100 may include one or more processors, databases, etc., as well as implement various logic, computer code, applications, and/or user interfaces, etc.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
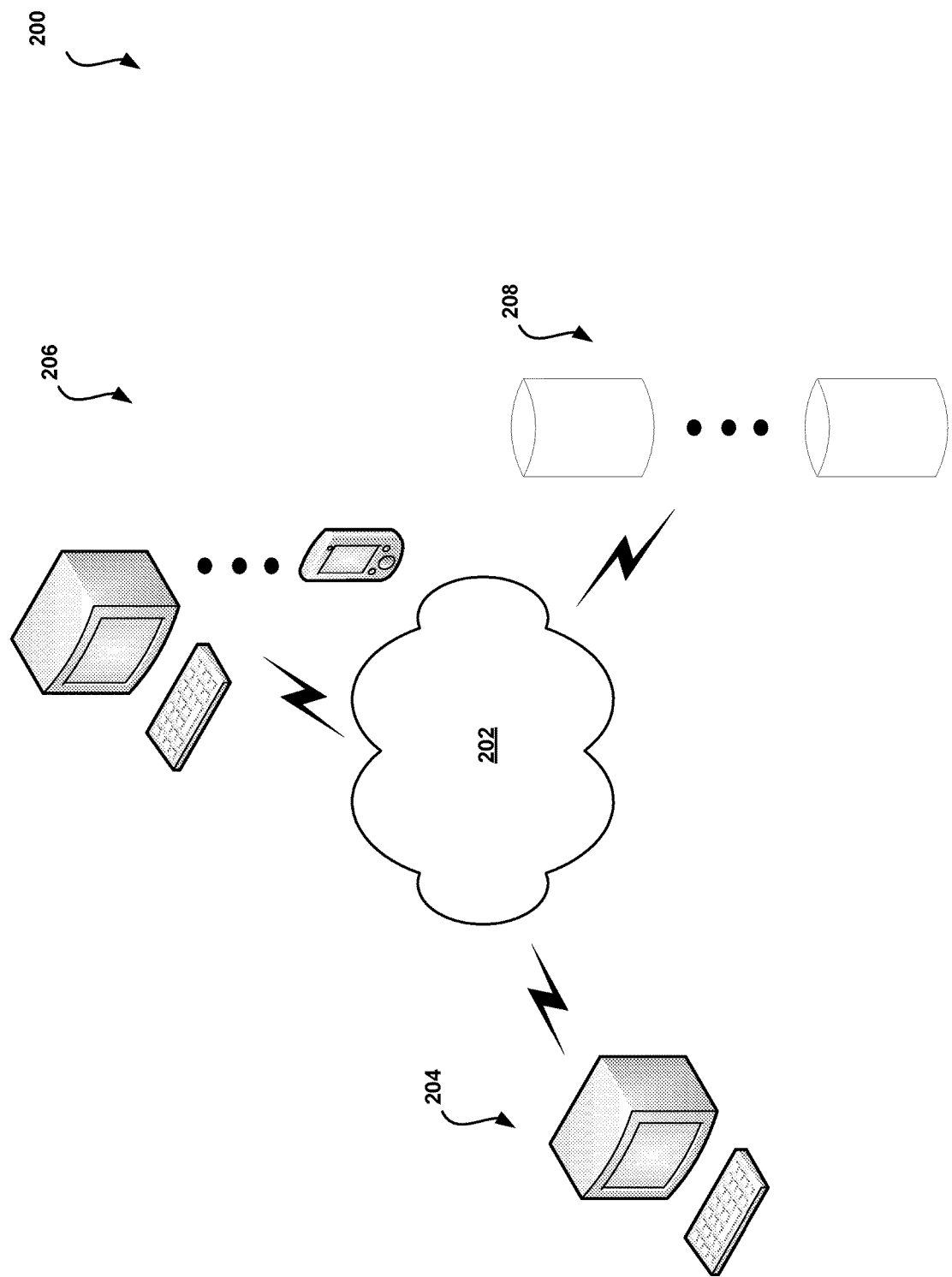
FIG. 2 shows a system for automatically determining customer issues and resolving issues using GUI based interactions with chatbot, in accordance with one embodiment.

FIG. 2 shows a system 200 for automatically determining customer issues and resolving issues using GUI based interactions with chatbot, in accordance with one embodiment. As an option, the system 200 may be implemented in the context of the details of the previous figure and/or any subsequent figure(s). Of course, however, the system 200 may be implemented in the context of any desired environment. Further, the aforementioned definitions may equally apply to the description below.

As shown, the system 200 includes a system 204, which may implement a variety of applications or software, etc. The system 204 may be capable of communicating with a plurality of systems/devices 206, either directly or over one or more networks 202, for automatically determining customer issues and resolving issues using GUI based interactions with chatbot. The system 204 may also be in communication with one or more repositories/databases 208.

Customer satisfaction plays an important role for businesses. It is the leading indicator for measuring customer loyalty, identifying unhappy customers, reducing churn and increasing revenue. It is also a key point of differentiation that helps companies to attract new customers in competitive business environments.

Customer service is important to an organization as it is often the only contact a customer has with a company. Some customers spend hundreds and even thousands of dollars per year with a company. Consequently, when they have a question or product issue, they expect a customer service department of company to resolve their issues.

Today, call centers are the major end points for resolving customer issues. For example, when a customer is having some issues with mobile billing, the customer may contact the support center to get the billing issue fixed.

Today, responsiveness to customer issues and needs has become increasingly important to most modern businesses. Handling such a large number of calls is not only a challenge for a telecom but also for e-commerce businesses that cannot afford the customer service provider with such a high unpredictable rate of calls.

Hence, there is need for an automated system and method that automatically determines the customer queries or issues or the reason for contacting customer care and provides prompt answers and solutions to the customer queries and issues.

The system 204 implements a method for automatically determining users' issues with an organization (e.g. with applications associated with the organization, etc.). The issues are determined in the form of storylines based on a set of rules, and the storylines are transformed to GUI components used for a GUI based chat interaction between the users and chatbots. A GUI based chat engine enables the users to interact with the chatbots to resolve their queries in minimal and easy interactions by simply selecting the users' issues on GUIs. In the context of the present description users are also interchangeably referred to as 'subscribers' or 'customers'.

As an example, if the system 204 determines that there is an anomaly with a subscriber's billing in the case of availing telephone service, the system 204 will automatically apply a set of rules to determine the issue by studying the billing pattern, subscriber account, profile, etc. The system 204 will further present a set of hypothetical issues in the form of GUIs to the subscriber while the subscriber communicates with a chatbot associated with the telephone service provider. As the customer prospective issues are already determined by the system 204, and plotted in the form of GUIs, the subscriber can only select the relevant issues from the GUIs that makes the process of interaction with the chatbot very convenient, and it results in faster resolutions of subscribe issues.

Hence, the system 204 is capable of determining behavioral and system anomalies using evolutionary rules and is capable of generating a timeline graph view of the activities of the users. By using the timeline graph views and creating GUIs, the system 204 is capable of resolving customer queries with minimal or no communication effort from the user. In some cases, the system 204 may suggest provisions for upscale advertisement depending on the user needs, where such provisions can be derived from the timeline graph views. As such, the system 204 monitors the usage patterns or any such indicator that represents a customer relationship with the organization (or applications of the organization), and the system 204 determines if there are any deviations from normal patterns, usual account status, etc. Based on the deviations, the system 204 develops storylines of the hypothetical issues and determines anomalies. Thereafter, the system 204 generates GUI based chat components for the user and also recommends solutions to address the anomalies.

Figure 3:
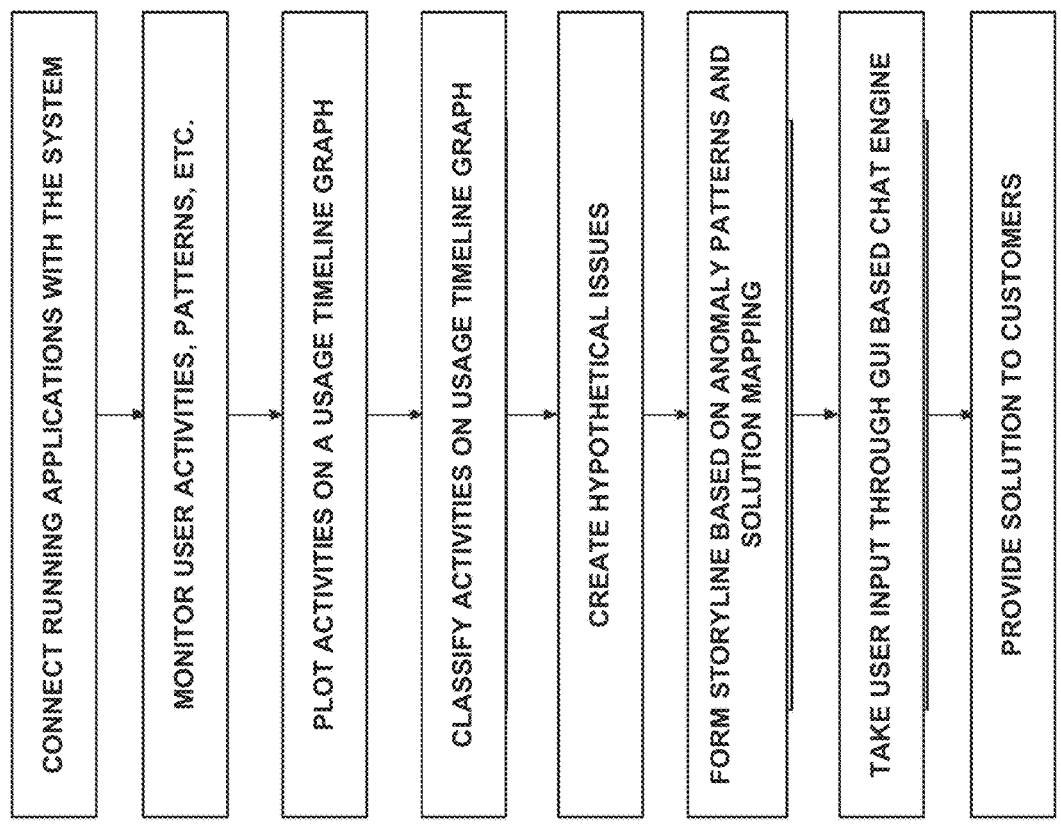
FIG. 3 shows a flow diagram for determining behavioral and system anomalies, and for providing a GUI based chat engine to resolve customer queries, in accordance with one embodiment.

FIG. 3 shows a flow diagram 300 for determining behavioral and system anomalies, and for providing a GUI based chat engine to resolve customer queries, in accordance with one embodiment. As an option, the diagram 300 may be implemented in the context of the details of the previous figures and/or any subsequent figure(s). Of course, however, the diagram 300 may be implemented in the context of any desired environment. Further, the aforementioned definitions may equally apply to the description below.

The steps of FIG. 3 are executed by a system (e.g. the system 204, etc.). The system incorporates the algorithms of the present invention, and can be integrated within a working environment/infrastructure of an organization serving a customer base.

In operation, the system connects running applications with the system. The system can be integrated with an application in which issues can arise, so that the system can automatically determine the customer queries or issues from the applications. The data transfer between system and the applications may take place via a single file. An example of the application can be understood as an online customer interface of a bank or a telephone company that deals with a customer account, customer profile, transactions, billing, etc. The system is closely integrated with the customer interface, and other infrastructure components of the organization managing the customer interface and its functionalities.

Further, the system monitors user activities and patterns, etc. The activities of a particular subscriber are monitored by a self-learning trainer and visualization algorithm provided in the system. The self-learning trainer and visualization algorithm will match the activities with the usual pattern followed in the subscriber profile. The pattern is based on customer usage history, bill, age, location, interest, etc.

Additionally, the system plots activities on a usage timeline graph. The user activities are plotted on a usage time line graph for visualization of the information extracted by the self-learning trainer and visualization algorithm. The plotting is done based on the rules created by a trainer or profiler present in the system.

The system classifies activities in the usage timeline graph. The mean and standard deviation are calculated based on the usage data obtained by the profiler. One such representation for classification of activities is shown in FIG. 4 by taking an example of billing for a telephone subscriber.

Figure 4:
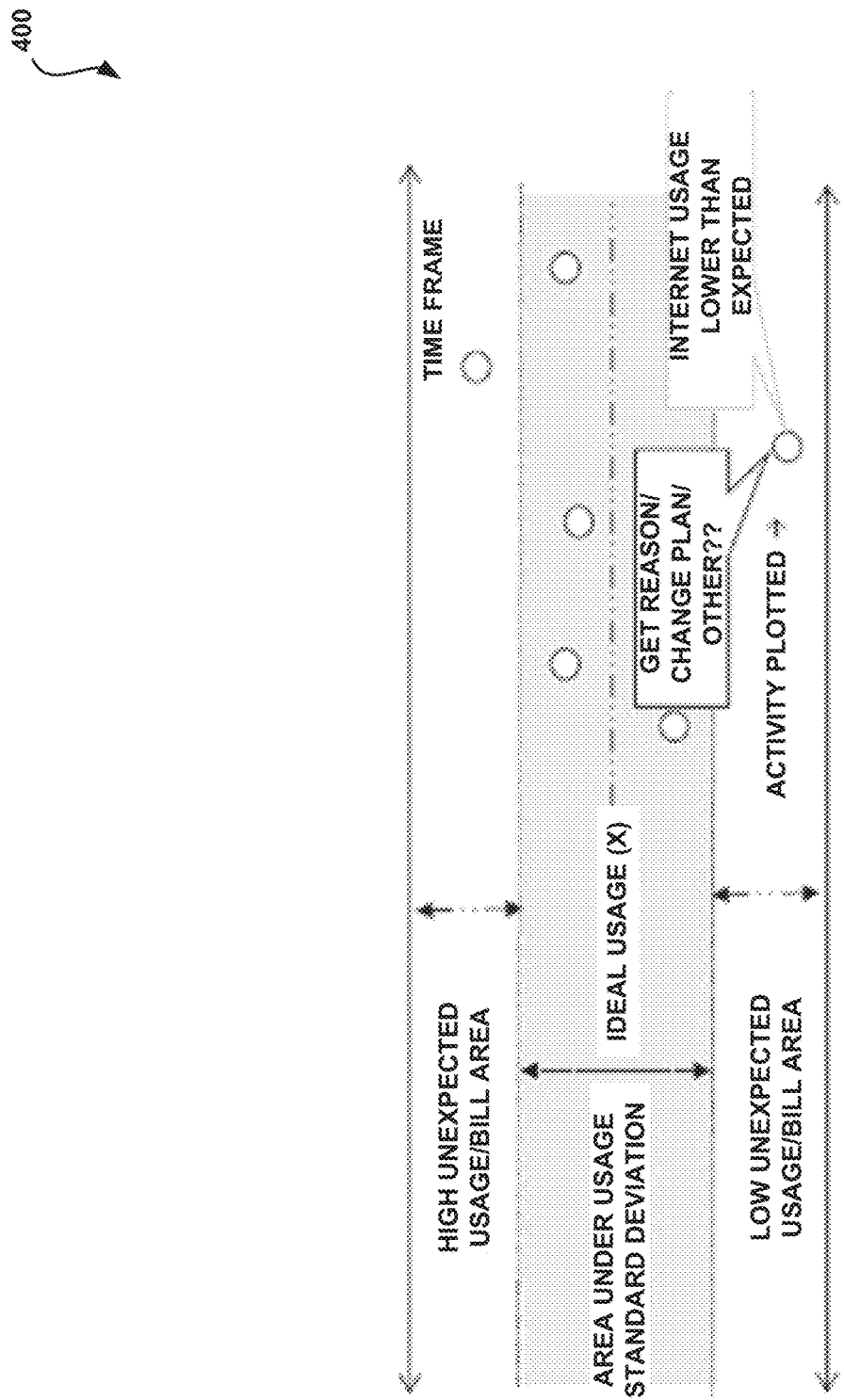
FIG. 4 shows an example illustrating a visualization of classification of activities, in accordance with one embodiment.

FIG. 4 shows an example 400 illustrating a visualization of classification of activities, in accordance with one embodiment. As an option, the example 400 may be implemented in the context of the details of the previous figures and/or any subsequent figure(s). Of course, however, the example 400 may be implemented in the context of any desired environment. Further, the aforementioned definitions may equally apply to the description below.

In this example, the timeline graph is divided in to three portions: high unexpected usage or bill area, low unexpected usage or bill area and area under current usage. The circles represent the user activities. The activities are plotted in these areas based on the data usage. The activities that are lying in the low unexpected usage or bill area are subjected for pattern verification. The pattern verification is performed for determining whether to consider this activity as an anomaly or not. The activities that are lying above the line of standard deviation, in the high unexpected usage or bill area, will be considered as base for upscale plan advertisement. The activities lying in the ideal usage portion are considered as normal activities.

With further reference to FIG. 3, the system creates a hypothetical issue. The activities that are considered as anomalies are used to create hypothetical issues and corresponding solutions. For a single anomaly, more than one hypothetical issue-solution mapping is created.

Further, the system forms storylines based on the anomaly patterns and solution mappings. The storylines are formed from the issue-solution mapping using rules generated by the trainer or profiler and natural language processing engine. The rules are generated for the particular user using data from the similar customer profiles.

The system takes user input through a GUI based chat engine. The GUI based chat engine enables a user to raise queries without much typing and explanation to chatbot. The users do not need to explain something in a manner that is bounded with languages and rules. The interface will display the issues/problems that the user might be facing based on the created hypothetical issues. The users just have to tap on the user interface and the chatbot will understand the issue from existing storylines prepared by an algorithm connected with the system. In an embodiment, the issues can be displayed in an order of probability in the GUIs.

Additionally, the system provides a solution to a customer. The chat engine decides which issue-solution mapping has high a probability of being the actual issue based on the inputs received from user query and user profiling. The most suitable issue-solution mapping will be considered by the chat engine for providing a solution to the customer. Depending on the issue, instant solutions can be provided or the concerned department may be informed about the customer issue so the issue will be resolved as soon as possible. The actions that are taken to resolve the issue will be recorded by the trainer for future use, such as if the user is facing the same issue again then an immediate solution may be provided to the user based on the recorded actions.

Figure 5:
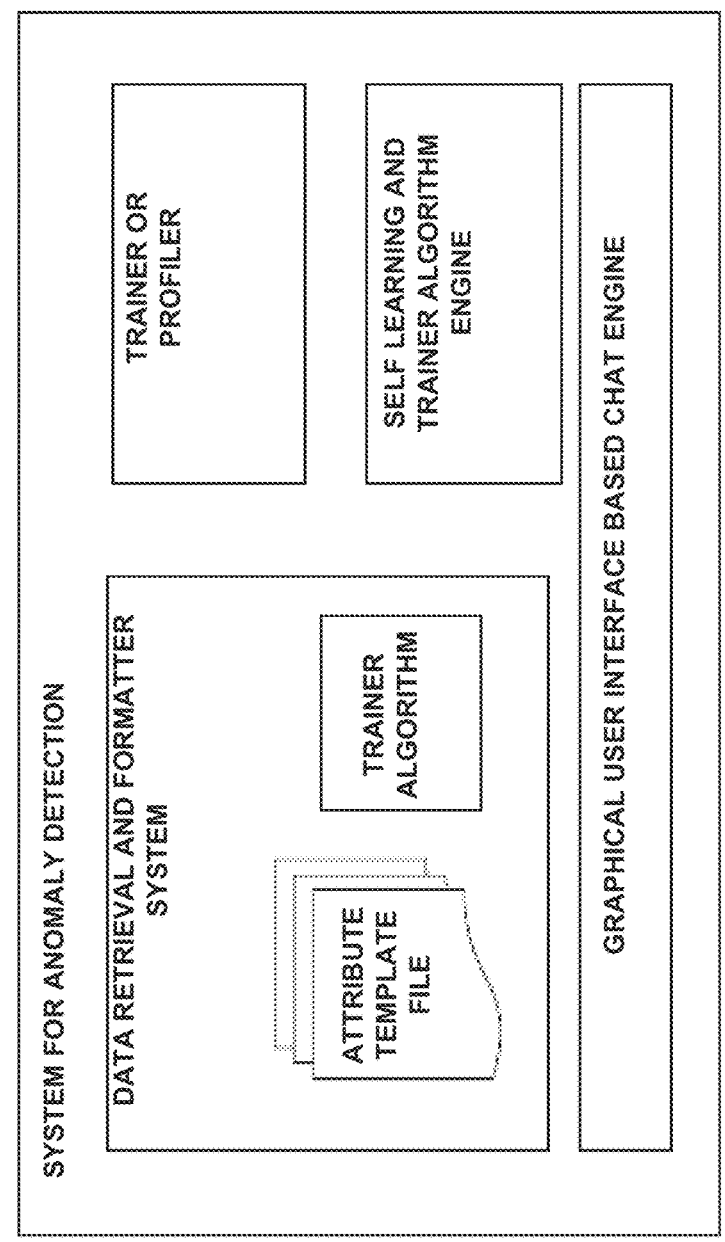
FIG. 5 shows a block diagram showing components involved in the detection of an anomaly, in accordance with one embodiment.

FIG. 5 shows a block diagram 500 showing components involved in the detection of an anomaly, in accordance with one embodiment. As an option, the diagram 500 may be implemented in the context of the details of the previous figures and/or any subsequent figure(s). Of course, however, the diagram 500 may be implemented in the context of any desired environment. Further, the aforementioned definitions may equally apply to the description below.

As shown in FIG. 5, in one embodiment, the system for anomaly detection may comprise a data retrieval and formatter system, a GUI based chat engine, a trainer or a profiler and a self-learning algorithm.

The data retrieval and formatter system ensures the data connectivity from any legacy application. It has an attribute template file and a trainer algorithm.

With respect to the attribute template file, it has templates that will map the attribute with the relevant application endpoint, protocol and schema in the format in which the relevant data needs to be displayed. In one embodiment, the files are stored in the attribute template format with .atf file extension. The files will hold every necessary detail to convert data from the external system in the required format.

With respect to the trainer algorithm, the algorithm is used for mapping attributes, user profiles and resolution steps for detecting anomalous behavior. It forms keys for differentiating one user activity from another. If a key is not present then it will create one new key for the activity and if the key is already present then it will update the attributes of the key according to the current activity.

The GUI based chat engine redefines the user experience of chatting with a bot. The user interface of the chat engine is designed in such a way that it displays the problems that the user might be facing. More specifically, it will provide the list of expected issues. Here, instead of explaining issues, a user may just tap on the UI and the chatbot will understand the issue from the storylines prepared by the algorithm connected with the system. So, the user queries are resolved with minimal communication effort from the user.

The trainer or profiler will create or modify dynamic rules at run time for a particular subscriber. The trainer or profiler will also maintain a profile group for every user that will contain data and profiles of similar kind of users. The rules will be a set of pre-defined and application controlled reference data which will evolve with time. These rules will be used as a base for declaring any activity as an anomaly.

The self-learning algorithm engine keeps track of all the activities in a specific subscriber account and matches the activities with the pattern followed in the subscriber profile. The pattern is based on customer usage history, bill, age, location, etc. It will create the profile if the subscriber profile is not present in the system. For any activity that is not falling in line with the profile, the pattern is recorded by the algorithm for the particular subscriber. The same records will be used further for creating hypothetical issues and corresponding solutions.

In an example of a billing scenario, inputs that are required to trigger a start of the algorithm are bill data, usage information, customer profile that will include age, location and interests of the user, and a rule reference database that will have certain rules for the particular user based on the profile of the user, which a standard deviation and mean is calculated. Outputs that the system obtains after algorithm execution include usages that are candidates of an anomaly forcing the user to call a customer service provider, advertisements for up-scalar plans, updated reference database rules that are used in a decision making process, and a modified customer profile.

Figure 6:
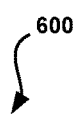
FIG. 6 shows an example showing a simplified representation for a storyline-anomaly-solution coupling for resolving customer issues, in accordance with one embodiment.

FIG. 6 shows an example 600 showing a simplified representation for a storyline-anomaly-solution coupling for resolving customer issues, in accordance with one embodiment. As an option, the example 600 may be implemented in the context of the details of the previous figures and/or any subsequent figure(s). Of course, however, the example 600 may be implemented in the context of any desired environment. Further, the aforementioned definitions may equally apply to the description below.

As shown, the data required for solving customer queries will include data stored by a customer relationship management application, current context that is information about current usage or billing of a user, a current information level seekable graph that will provide information of the sub-level on which the user is facing issues, such as for 3G issues (e.g. speed or plan on which user might be facing issue) so it will provide the sub-level information, and the .atf file pointers that will be pointing to the field on which the user might be facing an issue. The anomaly is decided based on some predefined rules, and the rules are updated by the trainer every time the new anomaly is found. The storyline will provide a complete path between the query and solution. The actions will be taken based on the metadata information, seekable graph and queries. The solution will be ranked based on the states. As an example, the three states based on which solution is ranked may include read, deep read and amend.

The read state will be given when user does not select anything from the user interface. In that case, the user will directly contact the human agents for help. The deep read state will be given when the user finds the query mentioned in the user interface so the detailed explanation of the problem can be taken from the user through multiple queries. The amend state is given when the user is looking for a change in the data, and the query is already present in the user interface. In this case, the algorithm will hand over the chat to the live agent for resolution.

In one embodiment, the storyline may be formed with the help of four major components before finding the intent. These components may include: 1) a query mapper with an .atf file for handling the required data retrieval in a required format; 2) rules that are predefined for mapping queries with application data scripts; 3) a query or intent from the user that is the query chosen that will be mapped on the selected data with the help of the query mapper to determine exactly what the user seeks on the selected data; and 4) a context that will hold the state and metadata that will determine the selection, preparation, and trigger of stored queries to fetch data from relevant applications.

In one embodiment, a flow after a user triggers any query may include: 1) once the user selects any query, the context related with the query is taken into consideration; 2) the current context will be amended to get the new context if the user selects any other query from the list; 3) the .atf file is fetched according to the query; 4) the context, current information and seekable input graph are updated according to the query; and 5) the trainer inputs are updated after user acknowledgment.

Figure 7:
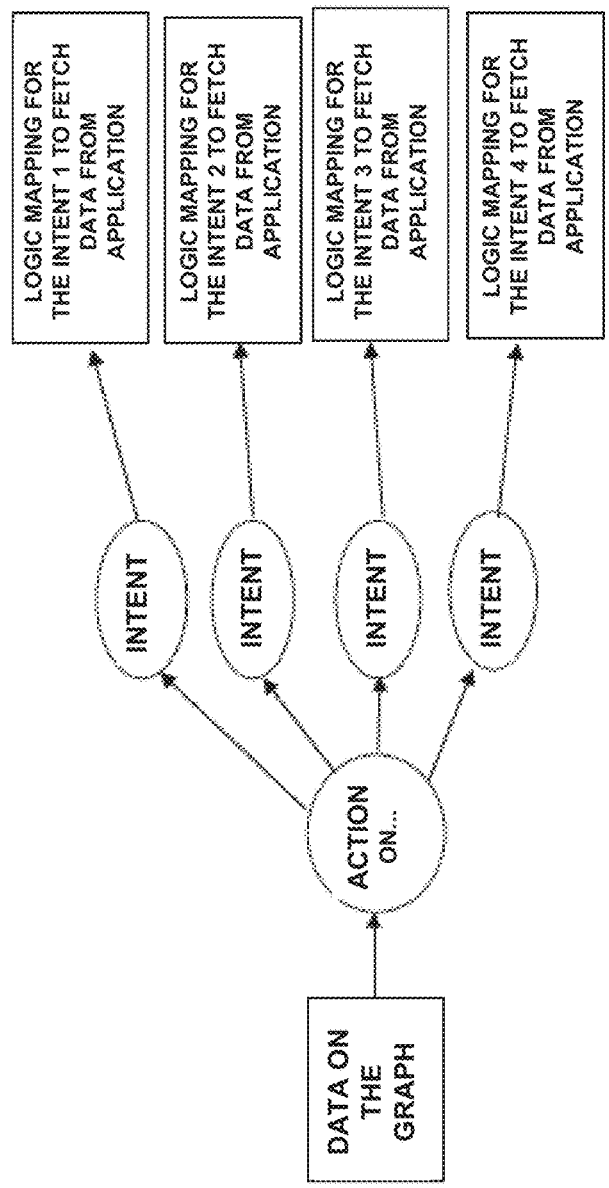
FIG. 7 shows an example showing a simplified representation for the hypothetical issue-solution mapping for resolving customer issues, in accordance with one embodiment.

FIG. 7 shows an example 700 showing a simplified representation for the hypothetical issue-solution mapping for resolving a customer issue, in accordance with one embodiment. As an option, the example 700 may be implemented in the context of the details of the previous figures and/or any subsequent figure(s). Of course, however, the example 700 may be implemented in the context of any desired environment. Further, the aforementioned definitions may equally apply to the description below.

As shown, 'data on the graph' represents the anomaly pattern data on the usage timeline graph. The 'action on data' represents the actions that are previously taken for resolving similar kinds of issues for a particular user. The actions are stored in the user profile. The actions are then mapped to the possible intents of the user. The Intent 1, Intent 2 . . . , Intent n herein represent the possible issues that the user might be facing. Every intent is then mapped to the query received from the GUI application. The query represents the issue that the user has selected on the GUI. The mapping of the query and the intent will be based on the reference data collected by the trainer or profiler. A single intent can be mapped with a single query or multiple queries from multiple applications. The intent-query (issue-solution) mapping is able to resolve the user issue with minimum hits.

Figure 8:
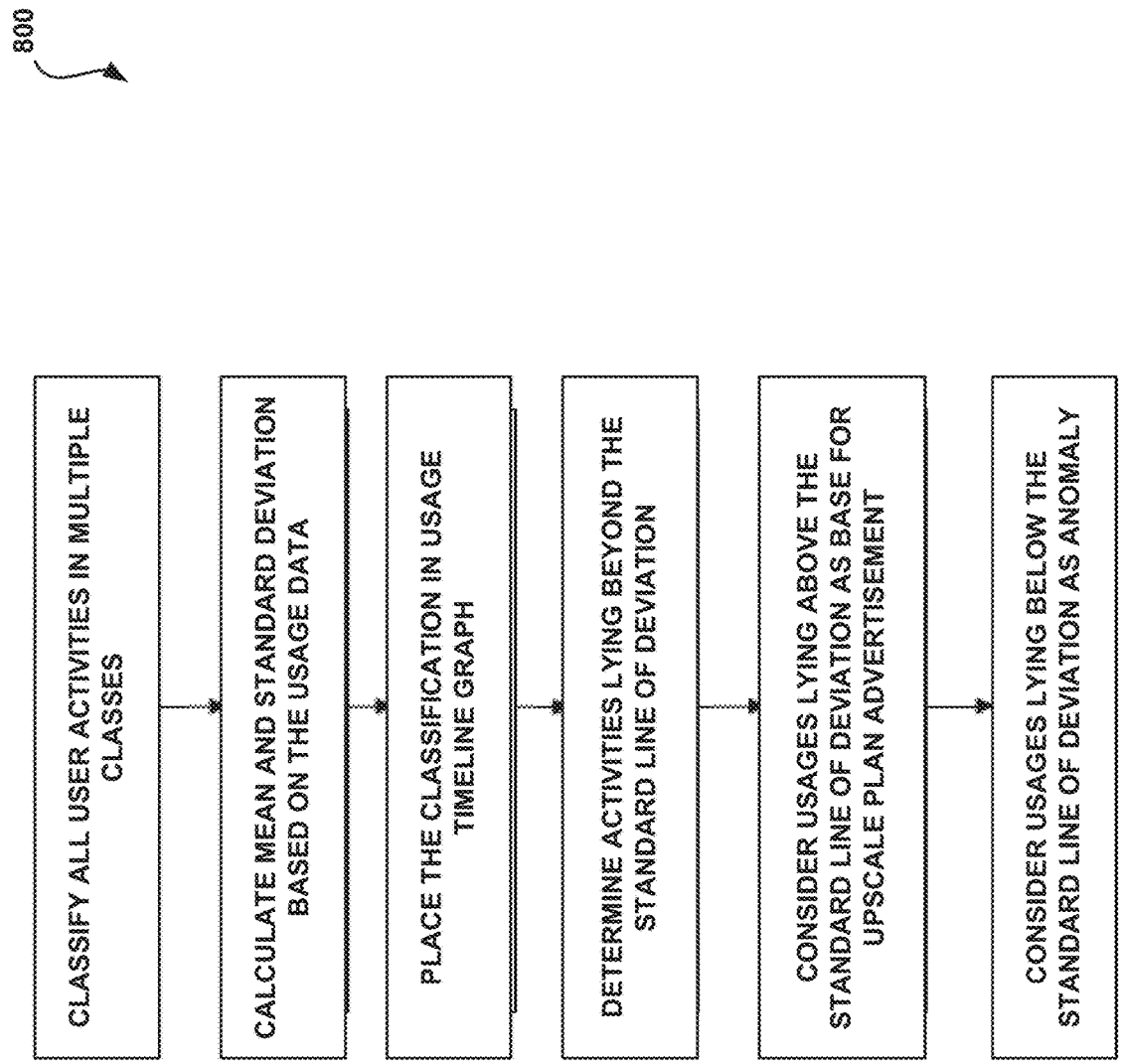
FIG. 8 shows a flow diagram for classification of activities, in accordance with one embodiment.

FIG. 8 shows a flow diagram 800 for classification of activities, in accordance with one embodiment. As an option, the diagram 800 may be implemented in the context of the details of the previous figures and/or any subsequent figure(s). Of course, however, the diagram 800 may be implemented in the context of any desired environment. Further, the aforementioned definitions may equally apply to the description below.

In operation, a system classifies all activities of a particular user in multiple classes for, as an example, classifying activities related to billing in as many classes as possible (e.g. calls to phone numbers in specific demographics can be classified in one class, etc.).

The system calculates a mean and standard deviation based on the usage data obtained from the user profile. Further, the system places all the classes in the usage timeline graph. The activity classes that are lying beyond the standard line of deviation (calculated in every iteration) are subjected to pattern verification by the system. The usages lying above the standard line of deviation (i.e. in high unexpected usage or bill area) will be considered as a base for recommending new or current plans.

The usages lying below the standard line of deviation common (i.e. in low unexpected usage or bill area) will be considered as an anomaly. Once an anomaly is declared, a hypothetical issue formulation process will be triggered by the system and based on the issue formulated, a storyline formation process will be triggered (also see FIG. 4).

Figure 9:
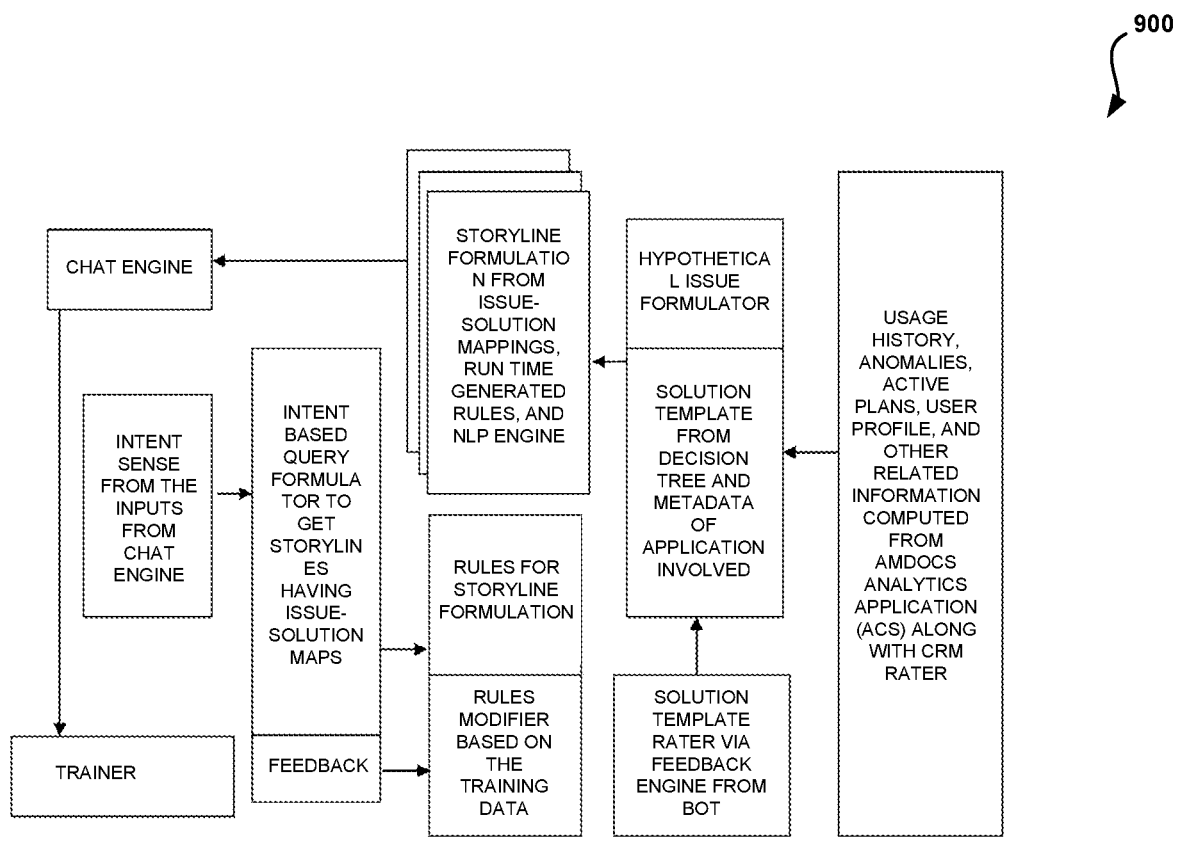
FIG. 9 shows a flow diagram for determination of behavioral and system anomalies and providing solutions based on the anomalies, in accordance with one embodiment.

FIG. 9 shows a flow diagram 900 for determination of behavioral and system anomalies and for providing solutions based on the anomalies, in accordance with one embodiment. As an option, the diagram 900 may be implemented in the context of the details of the previous figures and/or any subsequent figure(s). Of course, however, the diagram 900 may be implemented in the context of any desired environment. Further, the aforementioned definitions may equally apply to the description below.

In operation, user information such as usage history, anomalies, active plans, and user profiles computed by an analytics engine along with customer relationship management rater is taken into consideration for providing a solution for the anomaly that will be forcing a user to call customer service provider. Simultaneously, a solution template rater will be connected with the chat engine.

The hypothetical issue formulator will start forming hypothetical issues while taking metadata of the running application into consideration and then issue solution mapping will be provided. The storyline formulation will be done based on issue-solution mapping, run time rules and the natural language processing engine. The storyline and the issue-solution mapping will be passed to the chat engine so that the chat engine can display the issues that the user might be facing. The user will tap on the interface for selecting the issue and the chat engine will sense the exact issue from the user inputs and the storyline. The issue and the corresponding solution are updated in the user profile for future use and if the issue is new, rules for storyline formulation will be modified based on the training data.

Figure 10:
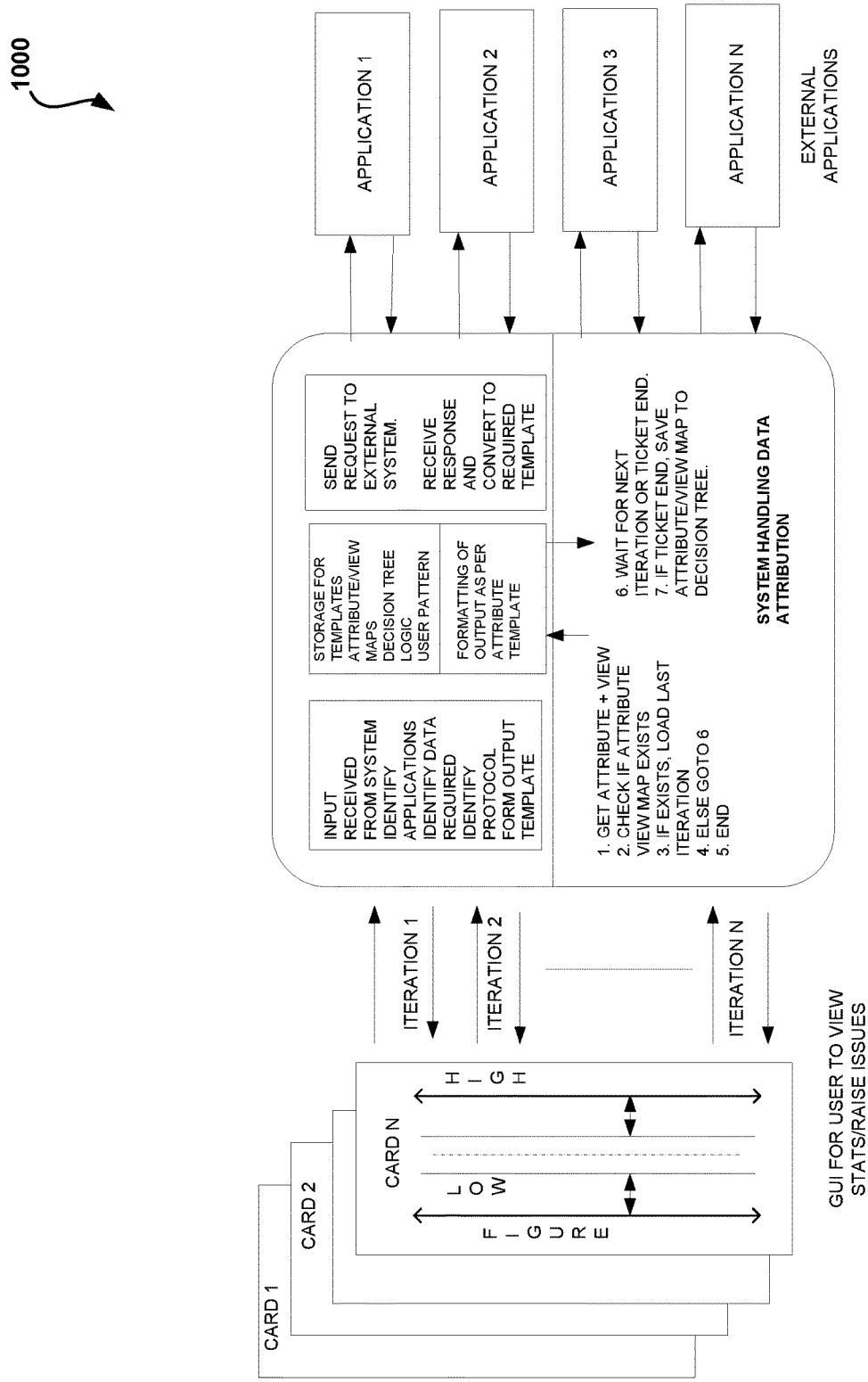
FIG. 10 shows a flow diagram illustrating an overall system/process implementation, in accordance with one embodiment.

FIG. 10 shows a flow diagram 1000 illustrating an overall system/process implementation, in accordance with one embodiment. As an option, the diagram 1000 may be implemented in the context of the details of the previous figures and/or any subsequent figure(s). Of course, however, the diagram 1000 may be implemented in the context of any desired environment. Further, the aforementioned definitions may equally apply to the description below.

As shown, the Application 1 to Application N represent the consumer applications, such as telecom applications or e-commerce applications in which user can face some issues. The external applications are directly connected with the system for automatically determining anomalies. The system uses the data of the user for anomaly identification in the application. The user data is collected from the application by the system in an application specific template. The received user data template is converted into a system required template. The user data templates are further stored in the system for determining user patterns. A decision logic is created from the user pattern for anomaly detection. The back-end process involved in the formatting of output is also explained in the FIG. 11.

With reference to FIG. 10, in step 1, a particular attribute is requested. The attribute specifies the area in which the user might be facing the problem, which, for example in telecommunication applications attributes can be roaming, data, network or billing. The view defines the time frame or the conditions on which the attribute data is needed. In step 2, the system is checking whether an attribute is already present in the system. In step 3, the last iteration of the attribute is loaded in the system, if an attribute is already present in the system. If the attribute is billing, then the last billing history of the customer will be loaded. In step 4, the system waits until the ticket ends. In step 5, once the ticket is closed, the new values of the attribute will be updated in the system for further use.

The Cards 1, Card2 . . . Card n represent the issue/problem displayed on the user interface or chat engine. The actual problem may not be detected in a single hit by the user on the chat engine. The rank of cards is determined based on the relevance index and background algorithm reading the history for similar issues from customers with same profile. There can be multiple iterations of interactions between the system and the user on the interface. Iteration 1, Iteration 2 . . . Iteration N represent the number of times the chat engine tried to determine the final problem from the user. Once the problem is identified, the user data that will be required for the resolving the problem is received by the system. The user data includes application type, data related to the problem, and the application protocol. The user data is formatted in a system required template by the system for further use.

Figure 11:
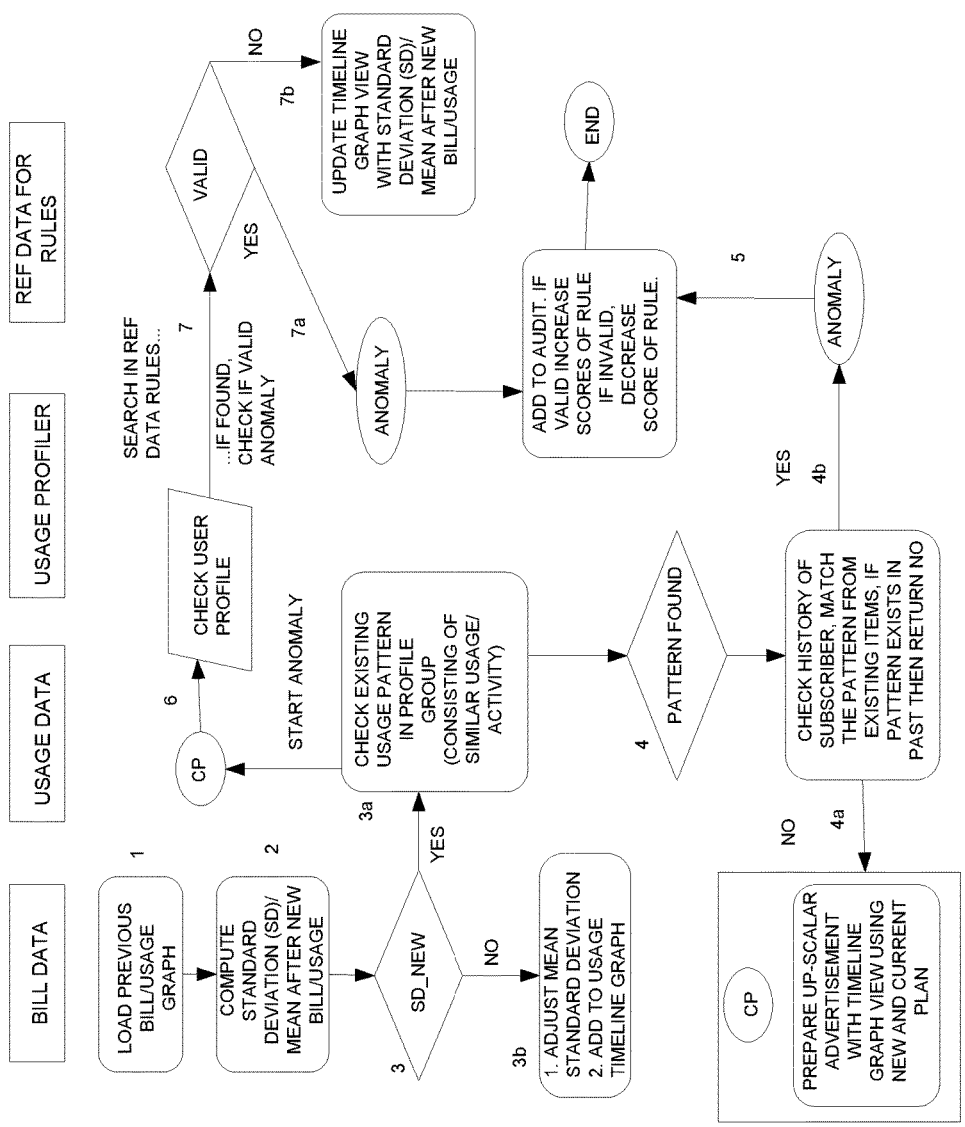
FIG. 11 shows a flow diagram illustrating control flow for automatically determining system anomalies, in accordance with one embodiment.

An example of the sequence of steps executed by the self-learner trainer and visualization algorithm for determining system anomalies and providing upscale advertisement is explained in the flowchart shown in FIG. 11.

FIG. 11 shows a flow diagram 1100 illustrating control flow for automatically determining system anomalies, in accordance with one embodiment. As an option, the diagram 1100 may be implemented in the context of the details of the previous figures and/or any subsequent figure(s). Of course, however, the diagram 1100 may be implemented in the context of any desired environment. Further, the aforementioned definitions may equally apply to the description below.

As shown, step 1 involves data collection from the running application in which a user is facing some issues. All kinds of data including bill data, usage data, reference data and usage profile may be collected from the application. The collected data is then loaded into the system for determining anomalies for further processing.

In step 2, after every new bill or usage, the algorithm computes the standard deviation or mean. In step 3, the new standard deviation is compared with the old standard deviation. In step 3a, if the new standard deviation comes out to be greater than the old standard deviation then the existing usage pattern is checked in a profile group created by a profiler that contains usages or activities performed by similar kind of users to determine whether the same kind of pattern exist in the profiler group or not.

In step 3b, if the new standard deviation is less than the old standard deviation then the mean and standard deviation for the new usage are adjusted and the usage is added to the usage timeline graph. In step 4, the system checks to see if patterns are found in the profile group. If the pattern is found in the subscriber group, the history of the subscriber is checked and the found pattern is matched with the existing patterns.

In step 4a, if the new pattern matches the existing patterns, then the customer profile is reviewed again and, using some predefined rules, preparation for up-scaler advertisements starts for the user using new and current plans.

In step 4b, if the pattern does not match with the existing patterns, then it will be considered as an anomaly. In step 5, the anomaly will be verified using a customer query. If an anomaly is found to be valid, a rule score will be increased or else decreased.

In step 6, the user profile is checked for anomalies using reference data rules if the existing usage pattern is suspected to be anomalous in step 3a. In step 7, the system checks to see whether the anomaly is valid or not.

In step 7a, if the anomaly is valid, the anomaly will be verified again using a customer query. If the anomaly is found to be valid, the rule score may be increased or decreased. In step 7b, if the anomaly is invalid, the timeline usage graph will be updated with a standard deviation and mean after new usage or bill.

FIG. 12 illustrates a network architecture 1200, in accordance with one possible embodiment. As shown, at least one network 1202 is provided. In the context of the present network architecture 1200, the network 1202 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 1202 may be provided.

Coupled to the network 1202 is a plurality of devices. For example, a server computer 1204 and an end user computer 1206 may be coupled to the network 1202 for communication purposes. Such end user computer 1206 may include a desktop computer, lap-top computer, and/or any other type of logic. Still yet, various other devices may be coupled to the network 1202 including a personal digital assistant (PDA) device 1208, a mobile phone device 1210, a television 1212, etc.

Figure 13:
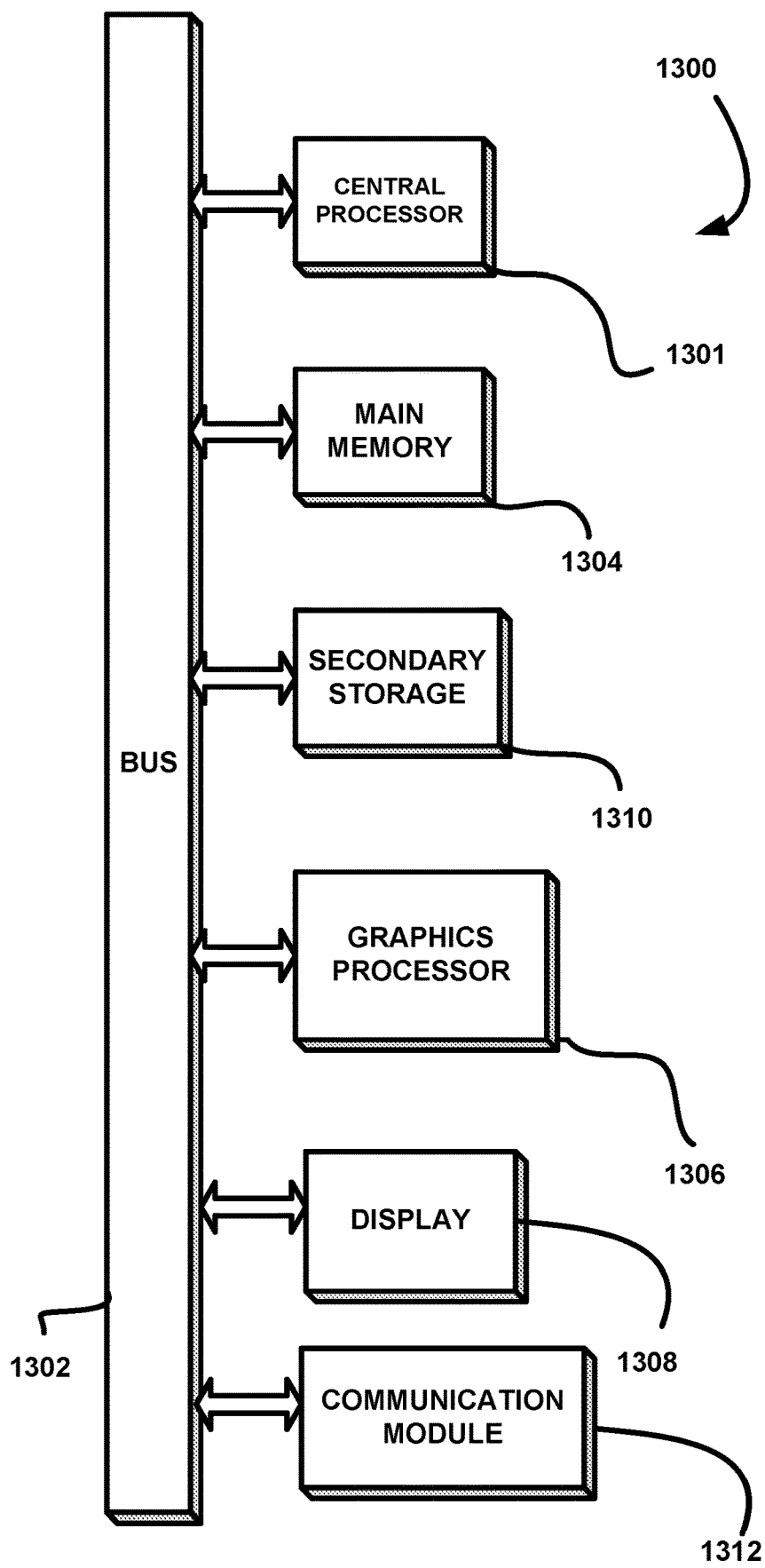
FIG. 13 illustrates an exemplary system, in accordance with one embodiment.

FIG. 13 illustrates an exemplary system 1300, in accordance with one embodiment. As an option, the system 1300 may be implemented in the context of any of the devices of the network architecture 1200 of FIG. 12. Of course, the system 1300 may be implemented in any desired environment.

As shown, a system 1300 is provided including at least one central processor 1301 which is connected to a communication bus 1302. The system 1300 also includes main memory 1304 [e.g. random access memory (RAM), etc.]. The system 1300 also includes a graphics processor 1306 and a display 1308.

The system 1300 may also include a secondary storage 1310. The secondary storage 1310 includes, for example, a hard disk drive and/or a removable storage drive, representing a floppy disk drive, a magnetic tape drive, a compact disk drive, etc. The removable storage drive reads from and/or writes to a removable storage unit in a well-known manner.

Computer programs, or computer control logic algorithms, may be stored in the main memory 1304, the secondary storage 1310, and/or any other memory, for that matter. Such computer programs, when executed, enable the system 1300 to perform various functions (as set forth above, for example). Memory 1304, storage 1310 and/or any other storage are possible examples of non-transitory computer-readable media.

The system 1300 may also include one or more communication modules 1312. The communication module 1312 may be operable to facilitate communication between the system 1300 and one or more networks, and/or with one or more devices through a variety of possible standard or proprietary communication protocols (e.g. via Bluetooth®, Near Field Communication (NFC), Cellular communication, etc.).

As used here, a "computer-readable medium" includes one or more of any suitable media for storing the executable instructions of a computer program such that the instruction execution machine, system, apparatus, or device may read (or fetch) the instructions from the computer readable medium and execute the instructions for carrying out the described methods. Suitable storage formats include one or more of an electronic, magnetic, optical, and electromagnetic format. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

It should be understood that the arrangement of components illustrated in the Figures described are exemplary and that other arrangements are possible. It should also be understood that the various system components (and means) defined by the claims, described below, and illustrated in the various block diagrams represent logical components in some systems configured according to the subject matter disclosed herein.

For example, one or more of these system components (and means) may be realized, in whole or in part, by at least some of the components illustrated in the arrangements illustrated in the described Figures. In addition, while at least one of these components are implemented at least partially as an electronic hardware component, and therefore constitutes a machine, the other components may be implemented in software that when included in an execution environment constitutes a machine, hardware, or a combination of software and hardware.

More particularly, at least one component defined by the claims is implemented at least partially as an electronic hardware component, such as an instruction execution machine (e.g., a processor-based or processor-containing machine) and/or as specialized circuits or circuitry (e.g., discreet logic gates interconnected to perform a specialized function). Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description above, the subject matter is described with reference to acts and symbolic representations of operations that are performed by one or more devices, unless indicated otherwise. As such, it will be understood that such acts and operations, which are at times referred to as being computer-executed, include the manipulation by the processor of data in a structured form. This manipulation transforms the data or maintains it at locations in the memory system of the computer, which reconfigures or otherwise alters the operation of the device in a manner well understood by those skilled in the art. The data is maintained at physical locations of the memory as data structures that have particular properties defined by the format of the data. However, while the subject matter is being described in the foregoing context, it is not meant to be limiting as those of skill in the art will appreciate that several of the acts and operations described hereinafter may also be implemented in hardware.

To facilitate an understanding of the subject matter described herein, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

The embodiments described herein included the one or more modes known to the inventor for carrying out the claimed subject matter. Of course, variations of those embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
implementing, by a system, a self-learning algorithm that keeps track of usage of an application in association with a subscriber;
accessing, by the system, usage patterns predefined for the subscriber;
calculating, by the system, a line of standard deviation using the usage patterns;
preparing, by the system, a usage timeline graph based on the usage of the application, the usage timeline graph indicating activities performed over time in association with the usage of the application and plotting a deviation of each of the activities from the standard deviation;
selecting, by the system, a subset of the activities indicated in the usage timeline graph, based on a position of the activities in the usage timeline graph, wherein the subset of the activities that is selected includes only activities lying below the line of standard deviation which indicate low unexpected usage of the application;
analyzing, by the system, the subset of the activities, using the usage patterns, to detect one or more anomalies in the usage of the application;
creating, by the system based on the one or more anomalies, hypothetical issues that the subscriber may be facing;
determining, by the system, solutions to the hypothetical issues; and
providing, by the system, a graphical user interface (GUI) based chat option to the subscriber to communicate with a chatbot, wherein the GUI based chat option presents the hypothetical issues and the solutions to the hypothetical issues.

2. The method of claim 1, wherein the hypothetical issues are presented in the GUI in an order of probability of being an actual issue that the subscriber is facing.

3. The method of claim 1, further comprising:
generating a storyline for each hypothetical issue of the hypothetical issues, wherein the storyline provides a complete path between a query input by the subscriber that corresponds to the hypothetical issue and one of the solutions to the hypothetical issue.

4. A computer program product comprising computer executable instructions stored on a non-transitory computer readable medium that when executed by a processor instruct the processor to:
implement a self-learning algorithm that keeps track of usage of an application in association with a subscriber;
access usage patterns predefined for the subscriber;
calculate a line of standard deviation using the usage patterns;
prepare a usage timeline graph based on the usage of the application, the usage timeline graph indicating activities performed over time in association with the usage of the application and plotting a deviation of each of the activities from the standard deviation;
select a subset of the activities indicated in the usage timeline graph, based on a position of the activities in the usage timeline graph, wherein the subset of the activities that is selected includes only activities lying below the line of standard deviation which indicate low unexpected usage of the application;
analyze the subset of the activities, using the usage patterns, to detect one or more anomalies in the usage of the application;
create, based on the one or more anomalies, hypothetical issues that the subscriber may be facing;
determine solutions to the hypothetical issues; and
provide a graphical user interface (GUI) based chat option to the subscriber to communicate with a chatbot, wherein the GUI based chat option presents the hypothetical issues and the solutions to the hypothetical issues.

5. A device, comprising:
a non-transitory memory storing instructions; and
one or more processors in communication with the non-transitory memory, wherein the one or more processors execute the instructions to:
implement a self-learning algorithm that keeps track of usage of an application in association with a subscriber;
access usage patterns predefined for the subscriber;
calculate a line of standard deviation using the usage patterns;
prepare a usage timeline graph based on the usage of the application, the usage timeline graph indicating activities performed over time in association with the usage of the application and plotting a deviation of each of the activities from the standard deviation;
select a subset of the activities indicated in the usage timeline graph, based on a position of the activities in the usage timeline graph, wherein the subset of the activities that is selected includes only activities lying below the line of standard deviation which indicate low unexpected usage of the application;
analyze the subset of the activities, using the usage patterns, to detect one or more anomalies in the usage of the application;
create, based on the one or more anomalies, hypothetical issues that the subscriber may be facing;
determine solutions to the hypothetical issues; and
provide a graphical user interface (GUI) based chat option to the subscriber to communicate with a chatbot, wherein the GUI based chat option presents the hypothetical issues and the solutions to the hypothetical issues.

* * * * *